(12) United States Patent
Akiyama et al.

(10) Patent No.: US 8,549,147 B2
(45) Date of Patent: Oct. 1, 2013

(54) DIVIDING CLOUD COMPUTING SERVICE INTO INDIVIDUAL JOBS SUCH THAT LEGAL AUDITING REQUIREMENTS ARE SATISFIED AND PRESENTING PLAN FOR DISTRIBUTED EXECUTION OF INDIVIDUAL JOBS

(75) Inventors: Kazuhito Akiyama, Kanawaga (JP); Kazuo Iwano, Tokyo (JP); Akira Ohkado, Kanawaga (JP); Tadashi Tsumura, Kanawaga (JP); Naohiko Uramoto, Kanawaga (JP)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 12/913,944

(22) Filed: Oct. 28, 2010

(65) Prior Publication Data
US 2011/0106951 A1 May 5, 2011

(30) Foreign Application Priority Data

Oct. 30, 2009 (JP) .................................. 2009-251080

(51) Int. Cl.
*G06F 15/173* (2006.01)
(52) U.S. Cl.
USPC ........... 709/226; 709/201; 709/202; 709/205; 718/104; 718/106
(58) Field of Classification Search
USPC ............. 709/201–205, 208, 223–226; 718/1, 718/100–102, 104, 106
See application file for complete search history.

(56) References Cited

U.S. PATENT DOCUMENTS

| 7,031,944 | B2 * | 4/2006 | Tanioka | 709/223 |
|---|---|---|---|---|
| 7,516,360 | B2 * | 4/2009 | Bacher et al. | 714/12 |
| 7,594,228 | B2 * | 9/2009 | Lam | 718/104 |
| 7,797,368 | B1 * | 9/2010 | Gadkari | 709/224 |
| 7,814,492 | B1 * | 10/2010 | Creemer et al. | 718/104 |
| 7,890,612 | B2 * | 2/2011 | Todd et al. | 709/220 |
| 8,024,395 | B1 * | 9/2011 | Odom | 709/226 |
| 8,056,083 | B2 * | 11/2011 | Jensen et al. | 718/104 |
| 8,131,843 | B2 * | 3/2012 | Yellin et al. | 709/224 |
| 8,150,904 | B2 * | 4/2012 | Queck et al. | 718/105 |
| 2004/0148605 | A1 * | 7/2004 | Kim | 718/100 |
| 2006/0070078 | A1 * | 3/2006 | Dweck et al. | 718/104 |
| 2007/0226743 | A1 * | 9/2007 | Takahashi | 718/104 |
| 2007/0234364 | A1 * | 10/2007 | Lipton et al. | 718/102 |

(Continued)

FOREIGN PATENT DOCUMENTS

| JP | 2001092910 A | 4/2001 |
|---|---|---|
| JP | 2004030573 A | 1/2004 |
| JP | 2008502967 A | 1/2008 |

*Primary Examiner* — Ramy M Osman
(74) *Attorney, Agent, or Firm* — Garg Law Firm, PLLC; Rakesh Garg; Libby Z. Toub (57) ABSTRACT

A computer network connects to a first computer, a second computer, other multiple computers, and a job category database A service to be executed by any of the other multiple computers is divided into multiple jobs; the job category is associated with each of the divided jobs; a region code and an instruction to execute the service are received from the first computer; and for each of the multiple jobs, the job category database is searched with the received region code and the associated job category as keys to acquire the operation identifier list corresponding to the job; the operation identifier list is transmitted to at least one of the other multiple computers; and a combination of the job, the identifier of that other computer and the identifier list are transmitted to the first computer.

9 Claims, 10 Drawing Sheets

| | 1302 | 1304 | 1306 | 1308 | 1310 | 1312 |
|---|---|---|---|---|---|---|
| | SERVICER ID | CERTIFIED REGION CODE | ACCESS INFORMATION | URL FOR ACQUIRING SERVICER DYNAMIC INFORMATION | CHARGING INFORMATION | SLA |
| | IBM Japan | JAPAN | ACCESS INFORMATION 1 | http://abc.ibm.com/info | CHARGING INFORMATION 1 | SLA_ALL1 |
| | Company B | unknown | ACCESS INFORMATION 2 | http://nmk.b.com/info1 | CHARGING INFORMATION 2 | SLA_ALL2 |

(56) References Cited

U.S. PATENT DOCUMENTS

| | | | |
|---|---|---|---|
| 2008/0229315 A1* | 9/2008 | Yoshida | 718/102 |
| 2010/0153960 A1* | 6/2010 | Youn et al. | 718/104 |
| 2010/0332262 A1* | 12/2010 | Horvitz et al. | 705/4 |
| 2011/0258246 A1* | 10/2011 | Khandekar et al. | 709/201 |

* cited by examiner

| | 402 | 404 | 406 |
|---|---|---|---|
| | JOB CATEGORY NAME | SUB-CATEGORY NAME | Description |
| | IT_RESOURCE | HW | RENT SERVER OR THE LIKE BY THE HOUR |
| | IT_RESOURCE | SW | RENT SOFTWARE BY THE HOUR |
| | COMMERCE | WEB SHOP | PROVIDE ENVIRONMENT FOR OPENING SHOP ON WEB |
| | COMMERCE | BANKING | PERFORM PROCESSING OF BANK ACCOUNT |
| | DATA | WEB SEARCH | PERFORM SEARCH |
| | DATA | CALCULATE | PERFORM CALCULATION |
| | DATA | DOCUMENT | CREATE A DOCUMENT |
| | DATA | DB STORE | PERFORM PROCESSING FOR STORING DATA INTO DATABASE |
| | MAIL | SEND | PERFORM MAIL TRANSMISSION PROCESSING |
| | MAIL | RECEIVE | PERFORM MAIL RECEIVING PROCESSING |

Figure 5

| | 502 | 504 | 506 |
|---|---|---|---|
| | DATA CATEGORY NAME | SUBCATEGORY NAME | Description |
| | PUBLIC | SHARE_FREE | INFORMATION DISCLOSED TO OTHERS FREE OF CHARGE |
| | PUBLIC | SHARE_COST | INFORMATION DISCLOSED TO OTHERS FOR PROFIT |
| | NORMAL | STRING | ORDINARY CHARACTER INFORMATION |
| | NORMAL | NUMERIC | ORDINARY NUMERICAL VALUE INFORMATION |
| | PRIVATE | PERSONAL | PERSONAL INFORMATION |
| | PRIVATE | GOVERMENT | INFORMATION BY PUBLIC AGENCY |
| | PRIVATE | HI-TECHNOLOGY | STATE-OF-THE-ART TECHNOLOGY INFORMATION |

Figure 6

| 602 | 604 | 606 | 608 | 610 | 612 | 614 |
|---|---|---|---|---|---|---|
| REGION CODE | DATA CATEGORY | DATA SUB-CATEGORY | JOB CATEGORY | JOB SUB-CATEGORY | AUDITING ITEM/AUDITING REQUIREMENT | EXECUTION REQUIREMENT |
| JAPAN | ALL | ALL | ALL | ALL | (AUDITING REQUIREMENT 1) | (EXECUTION REQUIREMENT 1) |
| JAPAN | PRIVATE | ALL | ALL | ALL | (AUDITING REQUIREMENT 2) | (EXECUTION REQUIREMENT 2) |
| JAPAN | PRIVATE | PERSONAL | ALL | ALL | (AUDITING REQUIREMENT 3) | (EXECUTION REQUIREMENT 3) |
| JAPAN | ALL | ALL | DATA | DOCUMENT | (AUDITING REQUIREMENT 4) | (EXECUTION REQUIREMENT 4) |
| JAPAN | PRIVATE | ALL | DATA | DOCUMENT | (AUDITING REQUIREMENT 5) | (EXECUTION REQUIREMENT 5) |
| JAPAN | PRIVATE | PERSONAL | DATA | DOCUMENT | (AUDITING REQUIREMENT 6) | (EXECUTION REQUIREMENT 6) |
| JAPAN | ALL | ALL | MAIL | ALL | (AUDITING REQUIREMENT 7) | (EXECUTION REQUIREMENT 7) |
| JAPAN | PRIVATE | ALL | MAIL | ALL | (AUDITING REQUIREMENT 8) | (EXECUTION REQUIREMENT 8) |
| JAPAN | ALL | ALL | COMMERCE | BANKING | (AUDITING REQUIREMENT 9) | (EXECUTION REQUIREMENT 9) |
| JAPAN | ALL | ALL | DATA | DB STORE | (AUDITING REQUIREMENT 10) | (EXECUTION REQUIREMENT 10) |

| SERVICE ID | SERVICE NAME | JOB ID | JOB NAME | JOB CATEGORY | JOB SUB-CATEGORY | JOB/DATA REQUIRE-MENT | SERVICER CANDIDATE |
|---|---|---|---|---|---|---|---|
| 1000 | PAYMENT OF BENEFIT | SRCH | SEARCH FOR THOSE ELIGIBLE FOR BENEFIT | DATA | WEB SEARCH | REQUIRE-MENT 1 | D-JPN |
| 1000 | PAYMENT OF BENEFIT | CALC | CALCULATION OF BENEFIT | DATA | CALCULATE | REQUIRE-MENT 2 | C-JPN |
| 1000 | PAYMENT OF BENEFIT | DOC | CREATION OF BENEFIT NOTIFICATION | DATA | DOCUMENT | REQUIRE-MENT 3 | F-JPN |
| 1000 | PAYMENT OF BENEFIT | MAILS | TRANSMISSION OF NOTIFICATION | MAIL | SEND | REQUIRE-MENT 4 | M-JPN |
| 1000 | PAYMENT OF BENEFIT | MAILS | RECEIVING OF ACCOUNT INFORMATION | MAIL | RECEIVE | REQUIRE-MENT 5 | M-JPN |
| 1000 | PAYMENT OF BENEFIT | TRANS | PAYMENT OF BENEFIT INTO ACCOUNT | COMMERCE | BANKING | REQUIRE-MENT 6 | B-JPN |
| 1000 | PAYMENT OF BENEFIT | FIN | RECORDING OF BENEFIT | DATA | DB STORE | REQUIRE-MENT 7 | S-JPN |

Figure 9

| JOB ID | JOB CATEGORY | JOB SUB-CATEGORY | DATA CATEGORY | DATA SUB-CATEGORY | AUDITING REQUIREMENT |
|---|---|---|---|---|---|
| ID1 | DATA | SEARCH | PRIVATE | PERSONAL | AUDITING REQUIREMENTS 1, 2, 3 |
| ID2 | DATA | CALC | NORMAL | NUMERIC | AUDITING REQUIREMENT 1 |
| ID3 | DATA | DOCUMENT | NORMAL | STRING | AUDITING REQUIREMENTS 1, 4 |
| ID4 | DATA | DOCUMENT | PRIVATE | PERSONAL | AUDITING REQUIREMENTS 1, 2, 3, 4, 5, 6 |
| ID5 | MAIL | SEND | PRIVATE | PERSONAL | AUDITING REQUIREMENTS 1, 2, 3, 7, 8 |
| ID6 | MAIL | RECEIVE | PRIVATE | PERSONAL | AUDITING REQUIREMENTS 1, 2, 3, 7, 8 |
| ID7 | COMMERCE | BAKING | PRIVATE | PERSONAL | AUDITING REQUIREMENTS 1, 2, 3, 9 |
| ID8 | DATA | DB STORE | PRIVATE | PERSONAL | AUDITING REQUIREMENTS 1, 2, 3, 10 |

Figure 10

| SERVICER | CERTIFIED REGION | SERVICE ID | SERVICE ATTRIBUTE | THE AMOUNT OF SERVICE PROVISION, SCHEDULE | COST (UNIT PRICE) | SLA (INCLUDING AUDITING/EXECUTION REQUIREMENTS) |
|---|---|---|---|---|---|---|
| IBM-JPN | Japan | D-JPN | ATR1 | A1 | CS1, CSD1 | S1, SS1, SD1, LOG1 |
| Company A | Japan | D-B | ATR2 | A2 | CS2, CSD2 | S2, SS2, SD2, LOG2 |
| Wan Company | Japan | D-X | ATR3 | A3 | CS3, CSD3 | S3, SS3, SD3, LOG3 |

Figure 11

| SERVICE ID 1102 | SERVICE NAME 1104 | JOB ID 1106 | JOB NAME 1108 | ID OF ASSIGNED SERVICER 1110 | AUDITING REQUIREMENT 1112 | COST (UNIT PRICE) 1114 | EXECUTABLE SCHEDULE 1116 | AUDITING LOG 1118 |
|---|---|---|---|---|---|---|---|---|
| 1000 | PAYMENT OF BENEFIT | SRCH | SEARCH FOR THOSE ELIGIBLE FOR BENEFIT | IBM Japan | S1, SS1, SD1 | 150 | A1 | LOG1 |
| 1000 | PAYMENT OF BENEFIT | SRCH | SEARCH FOR THOSE ELIGIBLE FOR BENEFIT | Company A at Tokyo | S2, SS2, SD2 | 200 | A2 | LOG2 |
| 1000 | PAYMENT OF BENEFIT | SRCH | SEARCH FOR THOSE ELIGIBLE FOR BENEFIT | Wan Company | S3, SS3, SD3 | 100 | A3 | LOG3 |

| SERVICER ID 1302 | CERTIFIED REGION CODE 1304 | ACCESS INFORMATION 1306 | URL FOR ACQUIRING SERVICER DYNAMIC INFORMATION 1308 | CHARGING INFORMATION 1310 | SLA 1312 |
|---|---|---|---|---|---|
| IBM Japan | JAPAN | ACCESS INFORMATION 1 | http://abc.ibm.com/info | CHARGING INFORMATION 1 | SLA_ALL1 |
| Company B | unknown | ACCESS INFORMATION 2 | http://nmk.b.com/info1 | CHARGING INFORMATION 2 | SLA_ALL2 |

Figure 14

| SERVICER ID | SERVICE ID | SERVICE URL | SERVICE ATTRIBUTE | CHARGING INFORMATION | SLA |
|---|---|---|---|---|---|
| IBM Japan | D-JPN | http://abc.ibm.com/service | ATR1 | COST1 | SLA_SS1 |
| Company B | D-B | http://nmk.b.com/service | ATR2 | COST2 | SLA_SS2 |

| SERVICER ID | SERVICE ID | JOB | REFERENCE JOB |
|---|---|---|---|
| IBM Japan | D-JPN | SR1 | REFJ1 |
| Company B | D-B | SR2 | REFJ2 |

Figure 17

| SERVICER ID | SERVICE ID | SERVICE AVAILABILITY STATE | DYNAMIC SLA | COST FLUCTUATION | AUDITING LOG |
|---|---|---|---|---|---|
| IBM Japan | D-JPN | A1 | SLA_D1 | 20%up | LOG1 |
| Company B | D-B | A2 | SLA_D2 | 10%down | LOG2 |

| 1902 | 1904 | 1906 | 1908 | 1910 | 1912 |
|---|---|---|---|---|---|
| REQUEST ID | SERVICE ID | REGION CODE | DATA CATEGORY/ SUB-CATEGORY | SERVICE EXECUTION PARAMETER | REQUEST |
| 0001 | 1000 | JAPAN | DATA CATEGORY 1 | SERVICE EXECUTION PARAMETER 1 | REQ1 |

Figure 20

| 2002 | 2004 | 2006 | 2008 | 2010 | 2012 |
|---|---|---|---|---|---|
| REQUEST ID | SERVICE ID | REGION CODE | DATA ACQUISITION ATTRIBUTE | SERVICE EXECUTION PARAMETER | REQUEST |
| 0001 | 1000 | JAPAN | DATA ACQUISITION ATTRIBUTE 1 | SERVICE EXECUTION PARAMETER 1 | REQ1 |

DIVIDING CLOUD COMPUTING SERVICE INTO INDIVIDUAL JOBS SUCH THAT LEGAL AUDITING REQUIREMENTS ARE SATISFIED AND PRESENTING PLAN FOR DISTRIBUTED EXECUTION OF INDIVIDUAL JOBS

FIELD OF THE INVENTION

The present invention relates to causing a service to be distributedly processed in cloud computing, and in particular, to a method, a computer program product and an apparatus for dividing a computing service into individual jobs in a manner that legal auditing requirements are satisfied and presenting a plan for distributed execution of the individual jobs.

BACKGROUND OF THE INVENTION

Cloud computing which has been attracting attention recently is defined in a variety of ways. One aspect of cloud computing is to appropriately combine and utilize computing resources distributed globally on the Internet to provide information services and application services to users.

In a cloud computing environment, various servicers (also referred to as service providers) provide various kinds of services under various conditions.

One of the conditions is a service level agreement (SLA).

The SLA is a form of contract in a broad sense, for a servicer to assure a service user of the quality of a service. The term SLA may be used to mean a data file in which various requirements to be observed by a servicer are described.

Typically, in cloud computing, a service user examines an SLA provided by a servicer and then agrees to a contract with the servicer.

Though an SLA is provided by a servicer, at present, standardization of the description contents and description form of SLA is being attempted.

SUMMARY OF THE INVENTION

The embodiments provide a method, system, and computer usable program product for dividing cloud computing service into individual jobs in a manner that legal auditing requirements are satisfied and presenting plan for distributed execution of individual jobs to user. An embodiment includes a computer network to which a first computer, a second computer, other computers, and a job category database are connected. The job category database includes combinations of the category of a job executed by any of the computers. The embodiment includes a list of identifiers of operations to be additionally executed when the job is executed by the any of the computers, and a region code indicating the location of the computer which executes the job within the computer network. The embodiment divides a service to be executed by any of the other computers into at least one job. The embodiment associates the job category with each of the divided jobs. The embodiment receives an instruction to estimate the service including the region code from the first computer.

For each of the multiple jobs, the embodiment searches the job category database with the received region code and the associated job category as keys to acquire the operation identifier list corresponding to the job. The embodiment transmits the operation identifier list to at least one of the other computers. The embodiment transmits, if receiving, from that other computer which has received the identifier list, a response to the effect that other computer is capable of executing operations corresponding to the identifier list, a combination of the job, the identifier of that other computer and the identifier list to the first computer.

BRIEF DESCRIPTION OF THE DRAWINGS

FIG. 8 is a configuration conceptual diagram of service division information;

FIG. 9 is a configuration conceptual diagram of a table of correspondence between each job or data and an auditing or execution requirement generated by an auditing requirement/execution requirement deciding section;

FIG. 10 is a configuration conceptual diagram of a servicer unit information table;

DETAILED DESCRIPTION OF THE DRAWINGS

In a cloud computing environment, one service, which a requester requests a primary servicer to execute, is commonly divided so that some subcontractor servicers can perform distributed processing. However, there does not exist an SLA that reflects the aspect of the distributed processing of a service at present.

For example, in a case where a government agency requests a primary servicer a service for processing personal information about citizens, there does not exist an SLA which specifies which region on a global computer network the service is to be distributedly processed.

As a result, a situation may arise in which the government agency cannot know which computer operating under what environment in which country processes the personal information. Such knowledge is undesirable from the viewpoint of secret protection.

It is desirable to form a cloud computing environment in which a government or a public agency sets standards with regard to safety and confidentiality of services, the standards are reflected in SLAs, and each servicer observes the SLA.

Furthermore, specifically, it is desirable that, for each classification of services or individual jobs constituting the services, and for each classification of data, a standard SLA reflect items to be observed by computer resources that process those services and jobs.

Such a standard may further be provided based on jurisdiction.

For example, a servicer in one jurisdiction can provide a service with high reliability and safety by configuring the service in accordance with an SLA advocated by the management government agency in the jurisdiction.

In the case where the servicer requests processing of a job from another subcontractor servicer, it is possible to assure the reliability and safety of the service by making the request in accordance with the SLA set by the management government agency.

In order to realize such a cloud computing environment reliability and safety, the present invention provides for creating a plan for distributed processing of a service under a cloud computing environment.

The operation identifier list may include the identifier of an operation for a computer which executes the job to acquire the operation parameter of the computer.

The operation may be in accordance with service level agreement (SLA) between a user of the first computer and a user of the second computer.

A. Description of Terms

The terms used through this specification and the claims will be described.

(1) Unit

Any device connectable to a network. For example, a server computer, a portable computer, a display, a storage device, office machines such as a facsimile machine and a copying machine, a printer and the like are included. A unit may be a virtual unit realized by computer software. Irrespective of the typical examples described above, a unit is not necessarily included in a given case. As far as the function of each unit described above is achieved, the various functions in the unit may be physically distributed and arranged in any suitable manner. Furthermore, the term "unit" may refer to a program code or a group of program codes existing on a computer memory.

(2) Service

A service is a tangible or intangible product obtained as a result of a unit operating in response to a request from another unit. A service is typically an operation or processing performed by a computer, or a reply of an operation or processing to a service requester but is not limited thereto.

(3) Requester Unit

A requester unit is a unit which requests provision of a service from another unit. Typically, a requester unit is a user's personal computer. The details of the requester unit's operation will be described later.

(4) Servicer Unit

A servicer unit is a unit which provides a service. Typically, multiple resources for information processing, for example, software, hardware and service application software are included in a servicer unit. A servicer unit which receives a service provision request from a requester unit first may be referred to as an original contractor servicer unit. A servicer unit which further receives the service provision request from the original contractor servicer unit may be referred to as a subcontractor servicer unit. There may be a case where multiple subcontractor servicer units exist, or where subcontractor servicer units may be linked in a chain.

(5) Job

A service can be divided into multiple jobs and executed by multiple servicer units. The division granularity can be appropriately changed by a servicer unit. A service may be divided so that a job is assigned to each of the resources for information processing described above. In an example case, the division granularity limit may be associating one job with a service. In such a case, the phrase "a service is divided into jobs" describes that the service is executed by the one job.

(6) Job Category

Jobs are classified according to their contents. Typically, jobs are classified into taxable commercial transaction, accounting processing, charging processing, arithmetic processing, text processing, search, and the like. Jobs may also be classified according to the nature of service requester entities. For example, the classification categories may be governmental or public, corporate activities, individual activities, non-profit activities, and the like.

According to the present invention, an additional operation (to be described later) other than execution of a job can be requested from an original contractor servicer unit or a subcontractor service unit according to the category of the job (the details will be described later).

Sub-categories may be provided as necessary.

(7) Data Category

Data processed by jobs can be classified according to their contents. For example, the categories may be: disclosable data (data that can be disclosed), personal data, military secret data, contract data, state secret data, state-of-the-art technology information, data disclosable only to restricted persons, and the like. An additional operation (to be described later) other than data processing may be requested from an original contractor servicer unit or a subcontractor servicer unit according to the data category (the details will be described later).

Sub-categories may be provided for the data categories as necessary.

In this specification, the case where data is included in a job is also contemplated. In such a case, data categories may be located at a level lower than job categories. That is, job categories may include data categories.

(8) Region Code

A region code is a code indicating a location where a servicer unit, which provides a service or processes a job, or an information processing resource constituting the servicer unit, is installed.

The location may be any place, such as a logical position or a physical position within a computer network, a geographical region, a country or a jurisdiction.

As described later, according to the present invention, it is possible to configure a cloud computing environment so that, when a job is executed, items to be observed by a servicer unit can differ according to the region code.

(9) Auditing Requirement

An auditing requirement refers to an operation requested from a servicer unit, which performs execution of a job or data processing, in addition to the execution of the job or the data processing.

For example, there may be a case where policies for security, personal information protection, and the like, differ according to jurisdiction regions specified by region codes. A servicer unit may have to perform the following operation to satisfy the requirements of a main management government agency.

When executing a service, a servicer unit should collect operation parameters within units and keep them for one year. The operation parameters include, for example, the identifier of a requester unit, the identifier of the servicer unit, service starting time, service ending time, regions where jobs derived from the service are distributedly executed by subcontractor servicer units, job execution starting time, job execution ending time, the identifiers of the subcontractor servicer units which executed the jobs, and the like.

In the example case where a service includes processing of personal information data, the following operations may be requested.

The service should be executed in the country where the requester unit is arranged.

Communication between servicer units should be performed after being encrypted.

Encryption strength should be equal to or above 128 bits.

Each servicer unit which executes the service should be authenticated by a predetermined server.

The servicer units should erase data related to the service after completion of execution of the service.

In the example case where a service includes state-of-the-art technology data, the following operations may be requested.

Processing of the service by a servicer unit arranged in a specified region should be avoided.

The service should be divided into multiple jobs, and the jobs should be executed by separate servicer units arranged in multiple regions.

The service should be executed with those servicer units which satisfy specified requirements. The requirements can include availability and the frequency of data backup.

In the example case where a service relates to a commercial transaction, the following operations may be requested.

For each transaction, transaction details should be kept and transmitted to a predetermined server.

The transaction details should include seller/buyer identification codes, sales, the amount of tax, payment method, transaction date and time, payment deadline and shipping charge.

As described above, the auditing requirements can be defined appropriately according to regional laws, customs, services, and categories or sub-categories derived from the services, but are not limited thereto.

Figure 6:
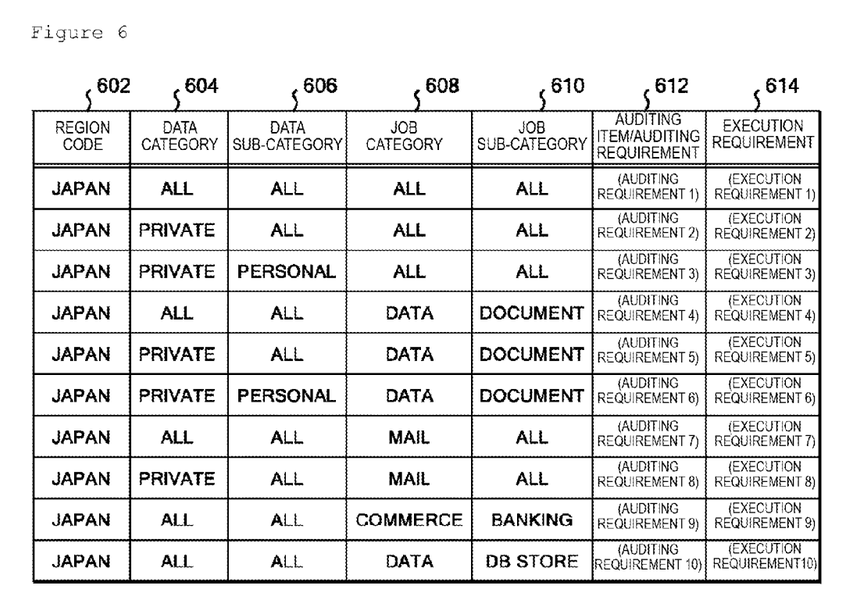
FIG. 6 is a configuration conceptual diagram of an auditing requirement and execution requirement database.

In this specification, a requirement for requesting a particular operation of a servicer unit, among the auditing requirements, may be referred to as an execution requirement (FIG. 6).

Execution requirements include, for example, specification of a region where a service is executed, the encryption strength of data communication between servicer units accompanying execution of the service, the contents of virus and spam countermeasures and level setting, the number of retries at the time of keeping data, retry interval, a transmission destination of a commercial transaction result, a period for storing received e-mails, necessity/unnecessity of attaching an electronic watermark and a unique ID to a document, and the like.

(10) The above region code, job categories, data categories and auditing requirements may be stored in or transferred to a network system in any expression form. For example, they can be expressed by character strings, flags, or the like.

It is possible to assign an identifier to an item of the auditing requirements so that an original contractor servicer unit can transmit an identifier to a subcontractor servicer unit to inquire whether an operation specified by the corresponding item is possible or not.

The subcontractor servicer unit can execute the operation corresponding to the identifier.

In this specification, the information is expressed not by abbreviations or flags but descriptively.

(11) Service Execution Instruction and Service Execution Estimation Instruction

These instructions are transmitted from a requester unit to an original contractor servicer unit. Though these names are used for convenience, any instruction that becomes a trigger for causing an original contractor servicer unit to perform an operation described in the claims is contemplated in the service execution instructions or service execution estimation instructions irrespective of the name or purpose of the instruction.

B. Hardware Configuration

Figure 1:
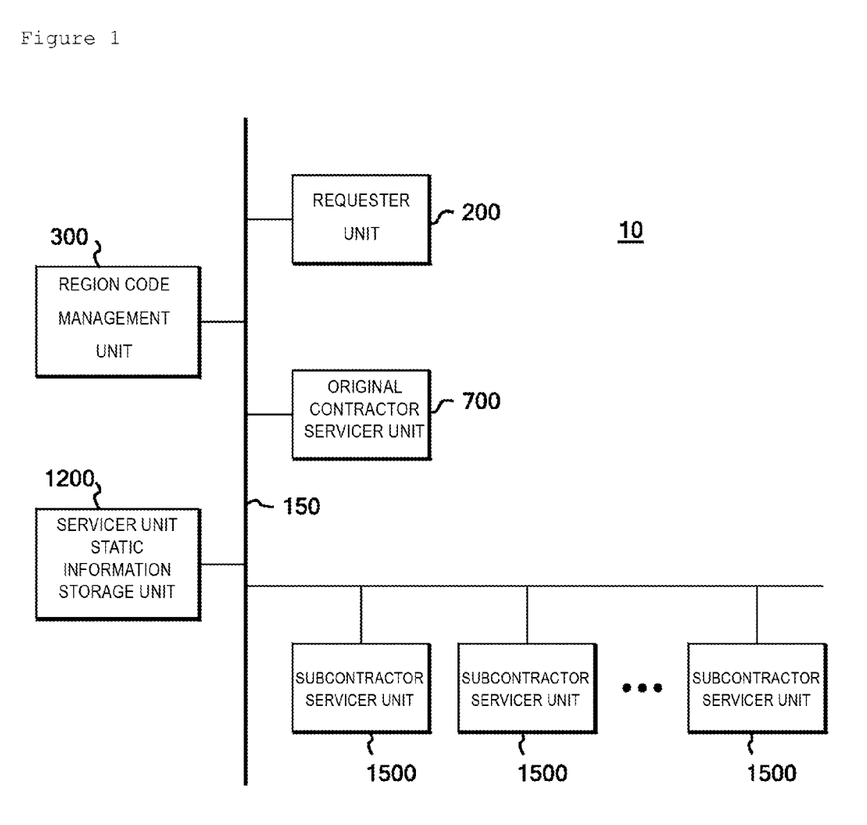
FIG. 1 is a configuration conceptual diagram of a cloud computing network according to the present invention.

FIG. 1 is a configuration conceptual diagram of a cloud computing network according to the present invention.

To a communication network 150, which may be public or private, there are connected a requester unit 200, a region code management unit 300, an original contractor servicer unit 700, a servicer unit static information storage unit 1200, and multiple subcontractor servicer units 1500.

The details of the function of each unit will be described later.

Figure 2:
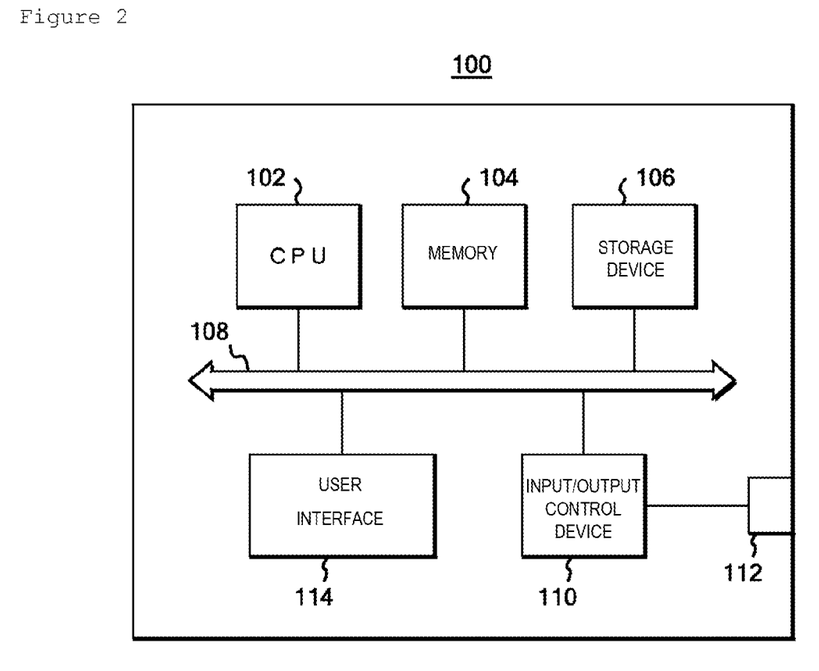
FIG. 2 is a hardware configuration diagram for realizing a requester unit, a region code management unit, an original contractor servicer unit, a servicer unit static information storage unit and multiple subcontractor servicer units.

FIG. 2 is a hardware configuration diagram for realizing the requester unit, the region code management unit, the original contractor servicer unit, the servicer unit static information storage unit and the multiple subcontractor servicer units of the present invention.

The components described below are only examples, and all the components are not necessarily essential components of the present invention.

A part of the components of each unit can be omitted or added according to the function of the unit.

Each unit may be configured with a CPU 102, a memory 104, a storage device 106, an input/output control device 110, a user interface 114, a bus 108 connecting those, and a communication port 112.

The code of a computer program operating on each unit may be stored in the storage device 106 or introduced into the memory 104 from an external apparatus via the communication port 112 and the input/output control device 110.

The computer program code may be executed by the CPU 102 by being loaded onto the memory 104 or may be executed by the CPU 102 while being stored in the storage device 106.

In each case, the memory 104 can be also used as a temporary storage memory.

The user interface 114 is used to display the operation state of each unit or to input an operation mode.

The computer program code can be divided into multiple parts and recorded in multiple storage media. It is also possible to record a part of the code divided into multiple parts to a storage medium in another external information processing apparatus connected to each unit, via the communication port 112 and a communication network (not shown) connected thereto, and for the CPU 102 to execute the divided codes so that they operate in cooperation with one another. Divided codes may be distributed to multiple apparatuses and may cause them to operate in cooperation with one another, for example, as a client/server system. A selection as to which code should be executed by which apparatus to realize which function may be made appropriately when a system is designed. The present invention contemplates any suitable form the code may take.

Each unit can be configured so that the unit is physically separated into functional blocks to be described below. Hardware similar to that shown in FIG. 2 is prepared for each functional block, and the functional blocks operate in association with one another via their the communication ports 112.

The operating system operating in a unit may support a graphic user interface multi-window environment as a standard, such as Windows® XP(R), AIX(R) and Linux(R), though it is not necessarily essential. Alternatively, the operating system may be another operating system like μiTRON.

The present invention is not limited to any particular operating system environment.

C. System Configuration

The requester unit 200 is typically a computer used by a user who requests a service from the original contractor servicer unit 700.

The user inputs a desired service identifier via the user interface 114 and transmits a service execution instruction or a service execution plan estimation instruction to the original contractor servicer unit 700.

It is desirable that a region code is attached to the service execution instruction or the service execution estimation instruction. Attaching the region code in this manner may assure that the service is executed safely in a desired region or within a jurisdiction.

The servicer unit 700 returns a result of execution of the service or an estimation of a service execution plan to the requester unit 200, and is displayed on the user interface 114.

Figure 3:
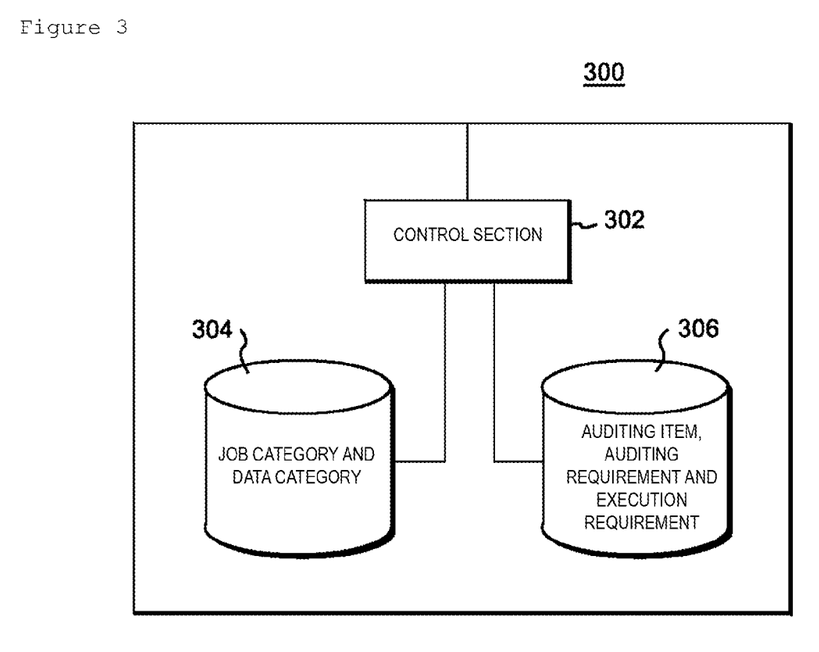
FIG. 3 is a functional block configuration diagram of the region code management unit.

FIG. 3 is a functional block configuration diagram of the region code management unit.

The functional blocks shown in FIG. 3 can be realized by the hardware illustrated in FIG. 2. However, they are logical functional blocks, and it is not necessarily meant that each of them is realized by one integrated piece of hardware or software.

Each functional block can be embodied by separate independent hardware, cooperating hardware, or combination of hardware or software.

The region code management unit 300 includes job category and data category databases 304, an auditing requirement and execution requirement database 306 and a control section 302.

In response to a request from the original contractor servicer unit 700, the control section 302 executes search of the databases and returns a search result to the original contractor servicer unit 700.

The job category and data category databases 304 store the categories of jobs that can be executed by the original contractor and subcontractor servicer units 700 and 1500 respectively, and the categories of data processed by the jobs.

These categories are preferably specified by international standardization activities or standardization activities in specific regions.

Figure 4:
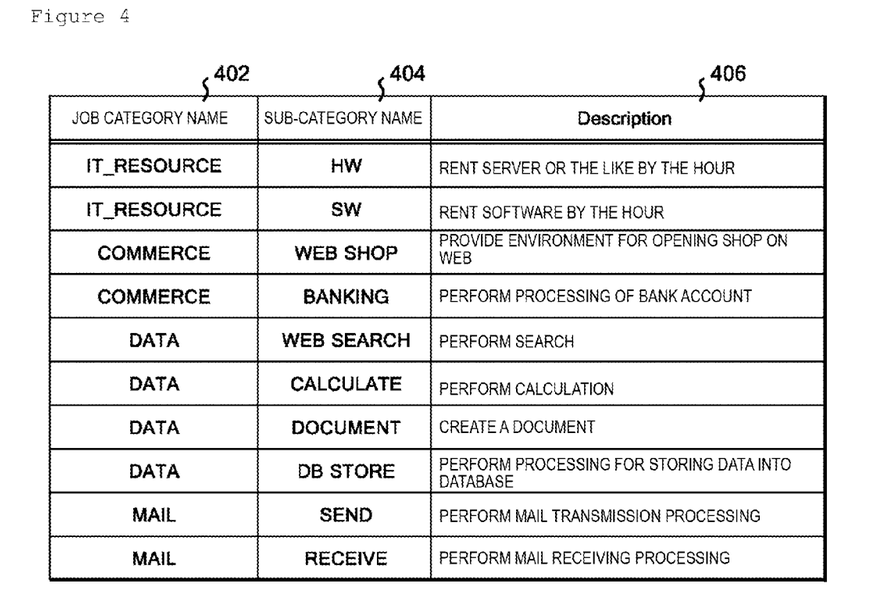
FIG. 4 is a configuration conceptual diagram of a job category database.

FIG. 4 is a configuration conceptual diagram of a job category database.

For example, a job category IT_RESOURSE is associated with a server-rental-by-the-hour job. Furthermore, a job sub-category may be associated according to which part of the server is to be rented by the hour. In the case of a hardware-rental-by-the-hour job, a job sub-category HW is associated.

In the case of a particular-software-rental-by-the-hour job, a job sub-category SW is associated.

Figure 5:
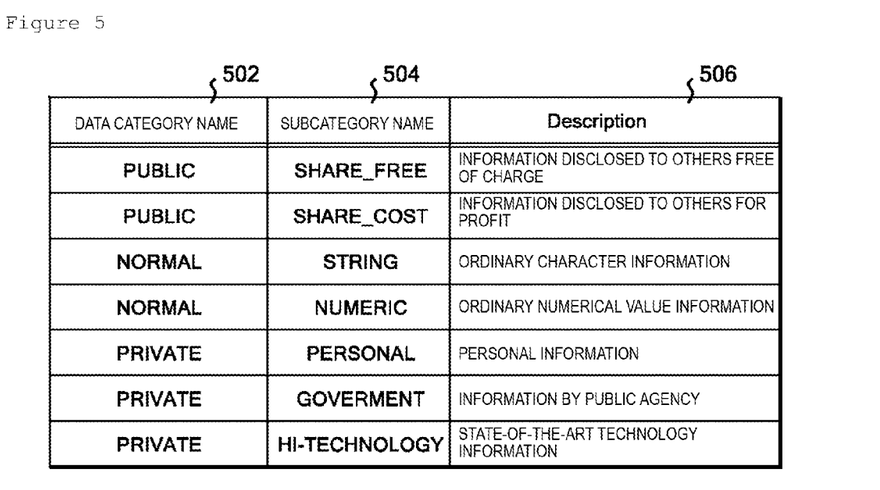
FIG. 5 is a configuration conceptual diagram of a data category database.

FIG. 5 is a configuration conceptual diagram of a data category database.

For example, in the case where data handled by a job is information that can be disclosed to others, a data category PUBLIC is associated. Furthermore, the disclosure is performed free of charge, so a data sub-category SHARE_FREE is associated.

On the basis of example descriptions 406 and 506 of the databases shown in FIGS. 4 and 5, the original contractor servicer unit 700 divides a service it provides into multiple jobs and associates categories 402, 404, 502 and 504 with the jobs (to be described later).

The job category and data category databases 304 or the copy thereof can be stored in other units appropriately.

For example, a servicer unit may store the copy and periodically inquire the region code management unit 300 to update the copy.

The auditing requirement and execution requirement database 306 stores correspondence among the categories of jobs which can be executed by the original contractor and subcontractor servicer units 700 and 1500 respectively, the categories of data processed by the jobs, region codes, and auditing requirements (including execution requirements).

FIG. 6 is a configuration conceptual diagram of the auditing requirement and execution requirement database.

In this example, for a set of (data category 604, data sub-category 606, job category 608 and job category 610), auditing requirements 612 and 614 to be associated with the set are stored when a region code 602 is JAPAN.

This association has the following meaning:

For example, the first row indicates that, as for all (identifier: ALL) of a jobs within the range of application of Japanese laws (region code: JAPAN) and data processed by the jobs, the original contractor and subcontractor servicer units 700 and 1500 have to perform auditing satisfying an auditing requirement 1 and an execution requirement 1 and execute an operation. Examples of the auditing requirements and execution requirements have been described in the above Section A.

In another example, when the category of a job executed within the range of application of Japanese laws is DATA, the sub-category of the job is DOCUMENT, the category of data handled by the job is PRIVATE, and the sub-category of the data is PERSONAL. The original contractor and subcontractor servicer units 700 and 1500 have to perform auditing satisfying an auditing requirement 6 and an execution requirement 6, and perform an operation.

For other region codes, for example, for the U.S., the above-described combinations of categories, auditing requirement and execution requirement can be similarly stored in the auditing requirement and execution requirement database 306.

That is, the auditing requirement and execution requirement database 306 makes it possible for the laws or government agencies of each country to define items to be observed by a servicer when the servicer executes a service, according to data and job categories. For example, in some cases, it is possible to impose more strict auditing requirements on processing of data with a high security level. In comparison, in other cases, more moderate auditing requirements can be imposed on processing of disclosable data to prioritize efficiency of service execution.

Figure 7:
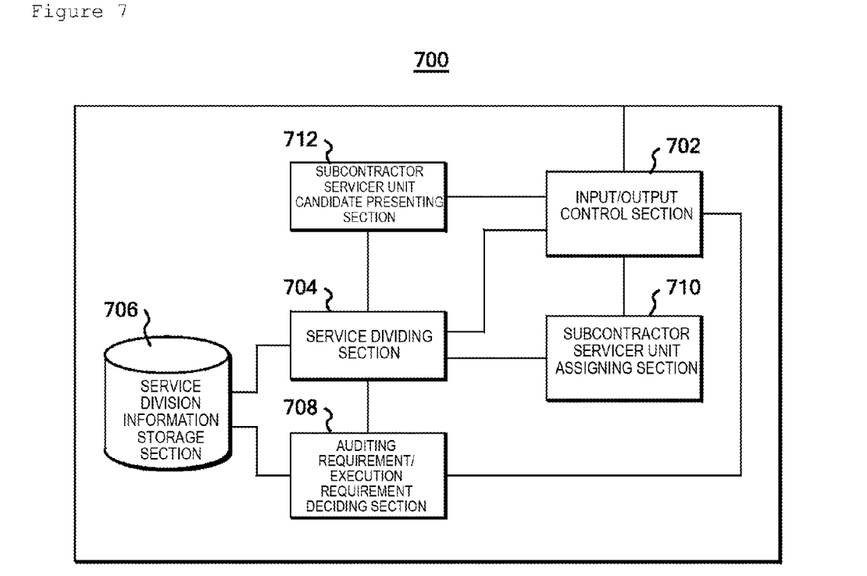
FIG. 7 is a functional block configuration diagram of the original contractor servicer unit.

FIG. 7 is a functional block configuration diagram of the original contractor servicer unit.

The original contractor servicer unit 700 includes an input/output control section 702, a service dividing section 704, a service division information storage section 706, an auditing requirement/execution requirement deciding section 708, a subcontractor servicer unit assigning section 710 and a servicer unit candidate presenting section 712.

The input/output control section 702 receives a service execution instruction or a service execution estimation instruction from the requester unit 200, and transmits it to the service dividing section 704.

The input/output control section 702 receives a service execution result or a service execution estimation from the service dividing section 704, and transmits it to the requester unit 200.

The service dividing section 704 divides a service specified by the requester unit 200 into individual jobs.

As described in Section A, a service is typically divided into multiple jobs so that the jobs can be distributedly executed. However, one job may be associated with one service.

As the jobs are executed in a distributed manner, data processed by the individual jobs may be arranged in a distributed manner as well.

To each of jobs and data, the job category 402, the job sub-category 404 (FIG. 4), the data category 502 and the data sub-category 504 may be assigned in advance when a service is designed (for example, when a program code is created).

It is also possible for the user of the original contractor servicer unit 700 to input the categories for each job to the service dividing section 704 via the user interface 114, referring to the job category and data category databases 304. The service dividing section 704 divides a service into individual jobs or data in accordance with the user input and associates a category or a sub-category with each of them.

The result of the division is stored into the service division information storage section 706 (FIG. 8) together with a service identifier 804, job identifiers 806, and job names 808.

The service dividing section 704 may cause job/data requirements 814, such as the resource amount required by each job or data in a servicer unit, to be stored into the service division information storage section 706, for example, in accordance with a user input.

The subcontractor servicer unit assigning section 710 may inquire a subcontractor servicer unit candidate 816 to be searched for the servicer unit candidate presenting section 712 and cause it to be stored into the service division information storage section 706. There may be multiple subcontractor servicer unit candidates 816.

The service dividing section 704 further requests the auditing requirement/execution requirement deciding section 708 to associate auditing requirements with the individual divided jobs or data (to be described later; FIG. 9).

The service dividing section 704 accesses the subcontractor servicer unit static information storage unit 1200 via the input/output control section 702 and acquires detailed information about services provided by the subcontractor servicer units 1500, for example, service names 1002, authentication government agencies 1004, service identifiers 1006, service attributes 108, service provision schedules and the amount of service provision 1010, service costs 1012, SLAs of the services 1014, and the like (FIG. 10).

Furthermore, the service dividing section 704 can also access each subcontractor servicer unit 1500 via the input/output control section 702 and acquire dynamic information about the subcontractor servicer unit 1500 (to be described later).

The information collected from the subcontractor servicer units 1500 is stored into a servicer unit information table (FIG. 10) in the storage device 106.

Each item in FIG. 10 is shown only as an example, and the dynamic and static information collected from the subcontractor servicer units 1500 is not limited thereto.

The service dividing section 704 also requests the subcontractor servicer unit assigning section 710 (to be described later) to search for a subcontractor servicer unit capable of executing each job or processing data under an associated auditing requirement or execution requirement.

Figure 11:
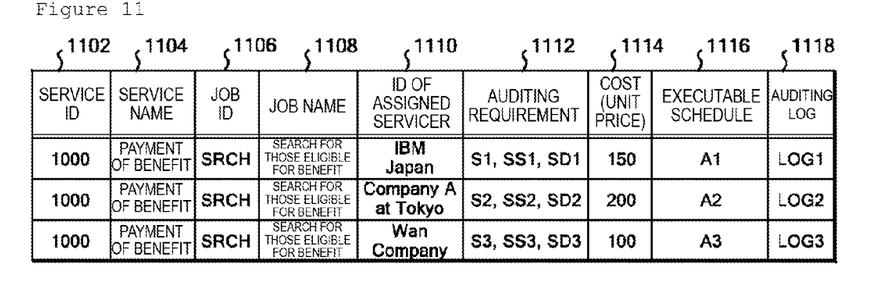
FIG. 11 is a configuration conceptual diagram of subcontractor servicer unit candidate information.

Then, the service dividing section 704 appropriately performs selection from a reply from the subcontractor servicer unit assigning section 710 and information about services provided by each servicer unit (FIG. 10) to generate subcontractor servicer unit candidate information (FIG. 11).

FIG. 11 is a configuration conceptual diagram of the subcontractor servicer unit candidate information.

The subcontractor servicer unit candidate information can include service identifier 1102, service name 1104, job identifier 1106, job name 1108, subcontractor servicer unit identifiers 1110, auditing requirements 1112 observed by the subcontractor servicer units, costs 1114 which the subcontractor servicer units request from the job execution service, job execution service schedules 1116, and auditing logs (to be described later) 1118 in response to the reference job.

The subcontractor servicer unit candidate information is transmitted to the requester unit by the service dividing section 704.

On the basis of this information, the requester can recognize that the service is divided into individual jobs, and each job is executed under each auditing requirement. In addition, the cost and schedule of execution of the jobs may also be determined.

FIG. 8 is a configuration conceptual diagram of the service division information.

A service specified by the requester unit 200 is divided into individual jobs or data by the service dividing section 704, and a category is associated with each job or data.

Other information may be associated with each job or data as necessary.

In the diagram of FIG. 8, a job category 810 and a job sub-category 812, and a data category and a data sub-category (not shown) as necessary are referred to by the auditing requirement/execution requirement deciding section 708 when the auditing requirement/execution requirement deciding section 708 associates an auditing requirement or an execution requirement with each job or data.

The auditing requirement/execution requirement deciding section 708 associates a category with each job or data in response to a request from the service dividing section 704.

The auditing requirement/execution requirement deciding section 708 accesses the auditing requirement and execution requirement database 306 via the input/output control section 702 and searches for an auditing requirement 612 and an execution requirement 614, with the job category 810, the job sub-category 812, the data category and the data sub-category (not shown) in the service division information, and a region code 602 transmitted from the requester unit 200 as keys.

The retrieved auditing requirement 612 or execution requirement 614 is associated with each job or data and stored in the storage device 106 (FIG. 9).

FIG. 9 is a configuration conceptual diagram of a table indicating correspondence between each job or data and an auditing or execution requirement which is generated by the auditing requirement/execution requirement deciding section.

Auditing requirements (execution requirements may be included) are associated with jobs 901.

Since matching between a set of (job category, job subcategory, data category, and data sub-category) and the table (FIG. 6) in the auditing requirement and execution requirement database 306 is checked for each job. Multiple auditing requirements may be associated with each job.

In response to a request from the service dividing section 704, the subcontractor servicer unit assigning section 710 searches for subcontractor servicer units 1500 capable of executing jobs within the cloud computing network 10.

The subcontractor servicer unit assigning section 710 accesses the service division information (FIG. 8) via the input/output control section 702 and inquires of each of the subcontractor servicer unit candidates 816 whether it is capable of executing each job.

Whether a candidate unit can execute a job or not is determined on the basis of whether or not the candidate unit can satisfy an auditing requirement 910 (FIG. 9) corresponding to the job.

Whether a candidate unit can execute a job or not may be determined on the basis of the job/data requirements 814 (for example, availability of resources required by the job), in addition to the above criterion. That is, dynamic information and static information (to be described later) about each subcontractor servicer unit 1500 may be added to judgment criteria.

For each job, the subcontractor servicer unit assigning section 710 notifies the identifier of a subcontractor servicer unit 1500 capable of processing the job to the service dividing section 704.

In response to an inquiry from the service dividing section 704, the servicer unit candidate presenting section 712 notifies candidates for subcontractor servicer units 1500 available within the cloud computing network 10, to the service dividing section 704. Any candidate selection criterion can be used. For example, it is sufficient to notify a list of subcontractor servicer units 1500 which satisfy a predetermined authentication criterion, to the service dividing section 704.

Figure 12:
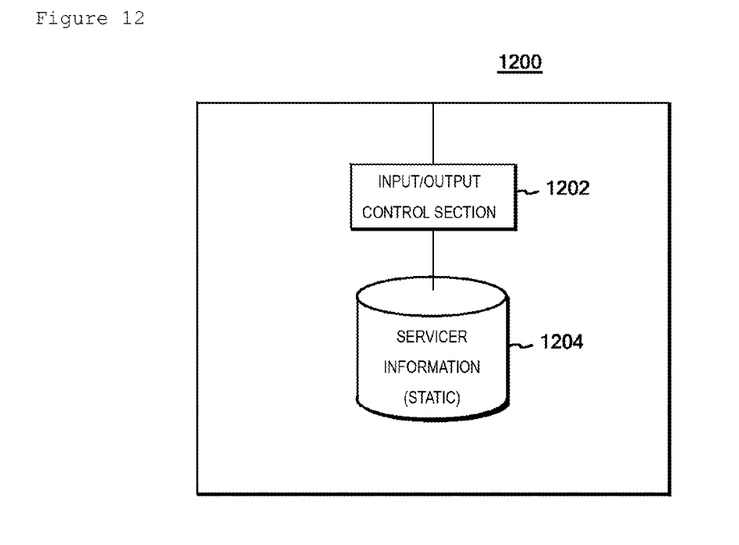
FIG. 12 is a functional block configuration diagram of the servicer unit static information storage unit.

FIG. 12 is a functional block configuration diagram of the servicer unit static information storage unit 1200.

The unit includes an input/output control section 1202 and a servicer unit static information database 1204.

The term "static information" is used to describe invariable information about a subcontractor servicer unit 1500 or a service provided thereby. That is, static information is information which does not change through the time-series stages of provision of a service.

In comparison, "dynamic information," to be described further later, is variable information about a subcontractor servicer unit 1500 or a service provided thereby. For example, availability of a subcontractor servicer unit at the current point of time is an example of dynamic information.

Since the dynamic information about the subcontractor servicer units 1500 is variable as described above, it is desirable that the original contractor servicer unit 700 acquires the dynamic information from the subcontractor servicer units 1500 each time it estimates a service execution plan.

In response to a request from the original contractor servicer unit 700, the input/output control section 1202 searches the database 1204 and returns a result to the original contractor servicer unit 700.

The input/output control section 1202 inquires of the original contractor and subcontractor servicer units 700 and 1500, acquires various information from a servicer unit and stores the information into the database 1204.

Figure 13:
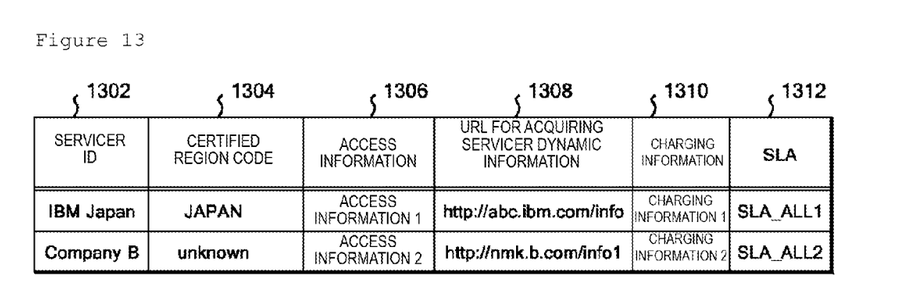
FIG. 13 is a configuration conceptual diagram of a servicer unit static information database.

FIG. 13 is a configuration conceptual diagram of the servicer unit static information database.

The information shown in FIG. 13 relates to servicer units.

The database 1204 stores, for example, servicer unit identification information 1302, region codes 1304 attached to servicer units, methods 1306 for accessing the servicer units 1500 (host names, authentication methods and the like), procedures 1308 for accessing static information about the servicer units, information 1310 such as basic charges of services provided by the subcontractor servicer units 1500, and SLAs of services provided by the subcontractor servicer units 1500.

Figure 14:
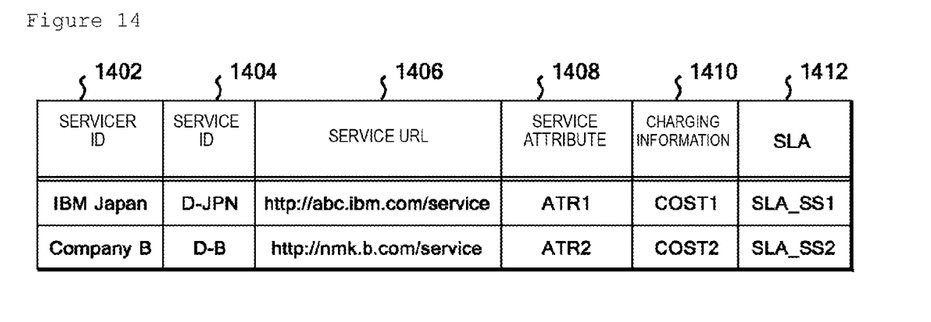
FIG. 14 is a configuration conceptual diagram of another servicer unit static information database.

FIG. 14 is also a configuration conceptual diagram of the servicer unit static information database. The database 1204 may include static information about each service, in addition to the information shown in FIG. 13.

The servicer unit static information database 1204 may include, for example, service identifiers 1404, methods 1406 for accessing services, service attributes (such as parameters to be given to the subcontractor servicer units 1500 at the time of requesting a service), SLAs 1410 to be observed by services, costs 1412 of individual services, and the like.

Figure 15:
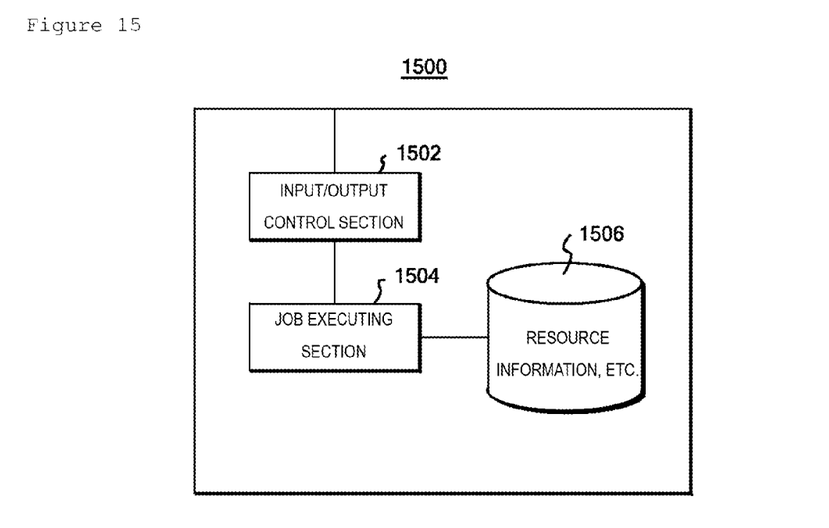
FIG. 15 is a functional block configuration diagram of the subcontractor servicer unit.

FIG. 15 is a functional block configuration diagram of the subcontractor servicer unit.

The subcontractor servicer unit 1500 includes an input/output control section 1502, a job executing section 1504 and a resource information database 1506.

The input/output control section 1502 receives an inquiry about a job, data as necessary, and possibility/impossibility of execution of the job, and an inquiry about subcontractor servicer unit dynamic information from the original contractor servicer unit 700 and transmits them to the job executing section 1504.

The input/output control section 1502 receives an inquiry about subcontractor service unit static information from the servicer unit static information storage unit 1200 and transmits it to the job executing section 1504.

The job executing section 1504 executes a job received from the original contractor servicer unit 700 and returns an execution result to the original contractor servicer unit 700.

Furthermore, when receiving an inquiry about possibility/impossibility of execution of a job from the original contractor servicer unit 700, the job executing section 1504 judges the possibility/impossibility of execution of the job in accordance with the criteria described before, and returns the result to the original contractor servicer unit 700.

When receiving an inquiry about static information from the servicer unit static information storage unit 1200, the job executing section 1504 acquires static information from the resource information database 1506 and returns it.

Figure 16:
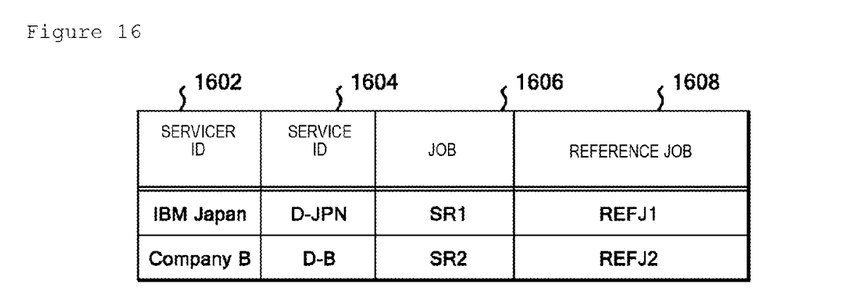
FIG. 16 is a configuration conceptual diagram of an inquiry about dynamic information which the original contractor servicer unit transmits to the subcontractor servicer unit by the original contractor servicer unit.

FIG. 16 is a configuration conceptual diagram of an inquiry about dynamic information which the original contractor servicer unit transmits to a subcontractor servicer unit.

The inquiry includes original contractor servicer unit identification information 1602, service identifiers 1604, information 1606 about jobs the processing of which is to be requested from the subcontractor servicer unit (such as the resource amount required by the job and the time zone when execution of the job is requested), and a reference job 1608.

The reference job is a kind of job to be executed by the subcontractor servicer unit 1500. A reference job is used for enabling the original contractor servicer unit 700 to acquire the operation performance and the like of the subcontractor servicer unit 1500.

The job executing section 1504 receives an inquiry about dynamic information from the original contractor servicer unit 700, acquires dynamic information from the resource information database 1506 and returns the acquired dynamic information.

Figure 17:
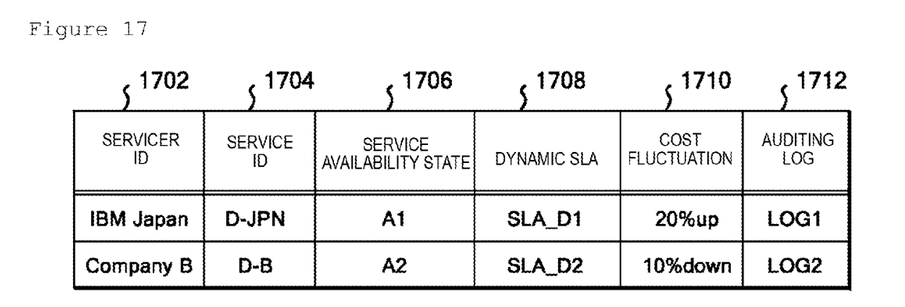
FIG. 17 is a configuration conceptual diagram of the dynamic information returned to the original contractor servicer unit from the subcontractor servicer unit.

FIG. 17 is a configuration conceptual diagram of the dynamic information returned to the original contractor servicer unit from the subcontractor servicer unit.

The dynamic information includes availability 1706 of a service of executing and providing a specified job, SLA fluctuations 1708, job execution service cost fluctuations 1710, and reference job execution results (auditing logs) 1712.

The values of the SLA fluctuations 1708 and the job execution service cost fluctuations 1710 reflect variation due to the contents of jobs requested from the subcontractor servicer unit. For example, even if the subcontractor servicer unit 1500 guarantees constant availability by an SLA, the availability may be temporarily reduced under particular conditions, such as in emergency situations.

D. Outline of Operation

The details of the operation of each unit have been described above. Here, the overall operations will be described using FIGS. 9 to 11 and FIGS. 18 to 21.

Figure 18:
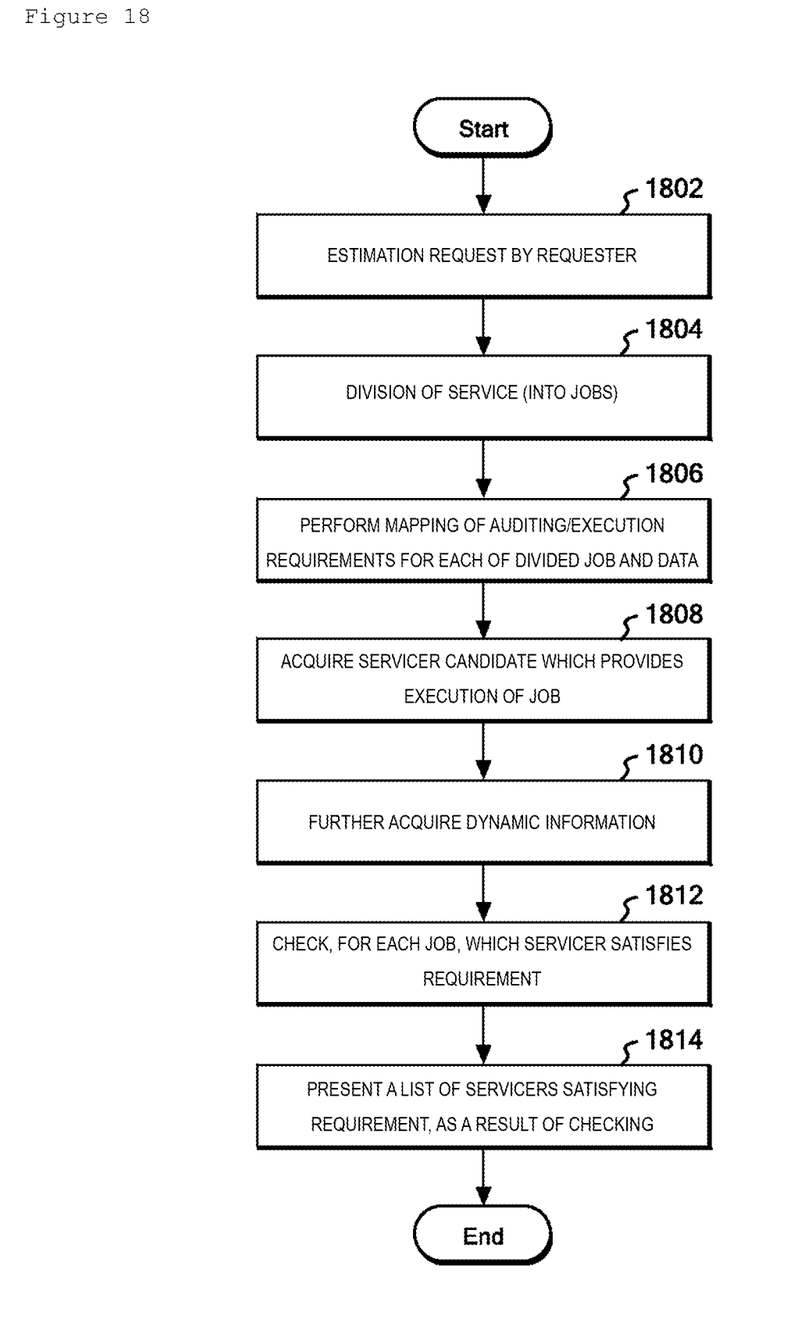
FIG. 18 is flowchart of processing performed by each unit from when the requester unit requests estimation of a service execution plan from the original contractor servicer unit until it acquires the estimation.

FIG. 18 is flowchart of processing performed by each unit from the point when the requester unit 200 requests estimation of a service execution plan from the original contractor servicer unit 700 until the point when it acquires the estimation.

The requester unit 200 requests estimation from the original contractor servicer unit 700 (step 1802).

Figure 19:
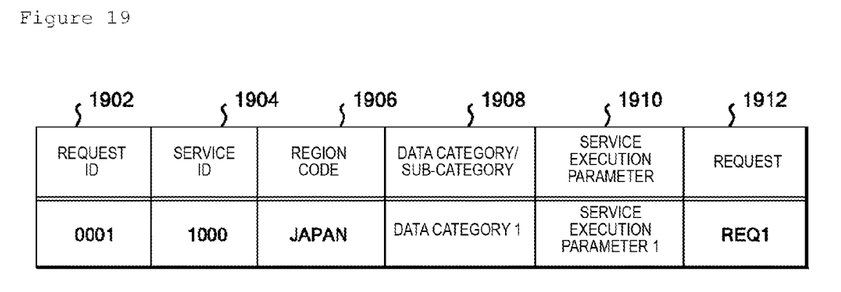
FIG. 19 is a configuration conceptual diagram of an estimation request.
Figure 20:
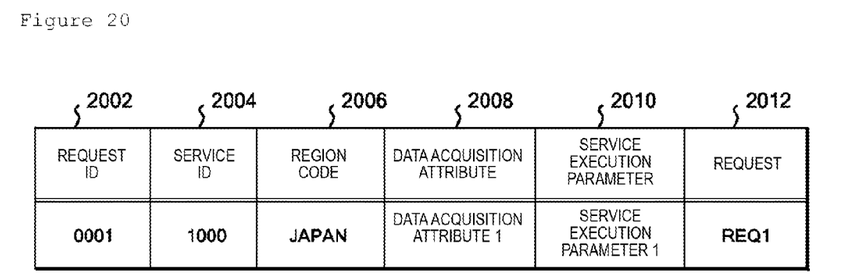
FIG. 20 is another configuration conceptual diagram of an estimation request.

FIG. 19 is a configuration conceptual diagram of an estimation request.

An estimation request includes a request identifier 1902, a service identifier 1904, a region code 1906, a data category or data sub-category 1908, a service execution parameter 1910 and other request items 1912.

If the format of data is standardized, and the original contractor servicer unit can determine the category of data on the basis of the format of the data, the data category or data sub-category 1908 can be omitted (FIG. 20). if not, a data acquisition method 2008 may be added to perform this determination.

The other request items 1910 can include, for example, desired cost of execution of the service and a desired schedule.

Next, the original contractor servicer unit 700, which has received an estimation request, divides a service specified by the requester unit 200 into individual jobs (step 1804; FIG. 8; refer to the description of the service dividing section 704).

Furthermore, the original contractor servicer unit 700 associates an auditing requirement and an execution requirement with each of the divided individual jobs (step 1806: FIG. 9; refer to the description of the service dividing section 704).

The original contractor servicer unit 700 obtains available subcontractor servicer unit candidates (step 1806; refer to the description of the servicer unit candidate presenting section 712).

The original contractor servicer unit 700 may acquire dynamic information about the subcontractor servicer units (step 1808). Then, the original contractor servicer unit 700 searches for subcontractor servicer units 1500 capable of executing the individual jobs, among the subcontractor servicer unit candidates, within the cloud computing network 10 (step 1810; refer to the description of the subcontractor servicer unit assigning section 710).

Lastly, the original contractor servicer unit 700 transmits subcontractor servicer unit candidate information to the requester unit 200 (FIG. 11).

As described above, by specifying a service and a region code, and a data category as necessary and requesting estimation of a service execution plan from the original contractor servicer unit 700, a requester can know what jobs the service is divided into, and how each job is processed by which subcontractor servicer unit.

E. Supplementation

Other aspects of the present invention will be disclosed as supplementation.

A computer network has connected thereto a first computer, a second computer, other multiple computers, and a job category database. The job category database includes combinations of the category of a job executed by any of the computers, a service level agreement, and a region code indicating the location of the computer which executes the job within the computer network. In such a network, a computer program product causes the second computer to operate as means for dividing a service to be executed by any of the other multiple computers into at least one job, means for associating the job category with each of the divided jobs, means for receiving an instruction to estimate the service including the region code from the first computer, and means for, for each of the multiple jobs, searching the job category database with the received region code and the associated job category as keys to acquire the service level agreement corresponding to the job, transmitting the operation identifier list to at least one of the other multiple computers, and transmitting, if receiving, from that other computer which has received the identifier list, a response to the effect that that other computer is capable of executing operations corresponding to the service level agreement, a combination of the job, the identifier of that other computer and the identifier list to the first computer.

A computer network includes a requester unit, an original contractor servicer unit and multiple subcontractor servicer units. In such a network, a computer program product causes, the original contractor servicer unit to operate as means for, in response to a request for estimation of a plan of execution of a service, dividing the service into multiple jobs, means for giving a service level agreement corresponding to each of the jobs on the basis of the type of the job, means for identifying a subcontractor servicer unit capable of executing the job in accordance with the given service level agreement, and means for notifying correspondence between the identified subcontractor servicer unit and the job to the requester unit.

The invention claimed is:

1. A computer usable non-transitory storage medium including a computer usable program product for dividing cloud computing services into individual jobs, wherein the computer usable program product is used in a computer network including a first computer, a second computer, other computers, and a job category database, wherein the job category database includes combinations of job categories, identifiers of operations to be executed, and a region code indicating a location of a computer which executes a job within the computer network, the product comprising:
   computer usable code for dividing a service to be executed by any of the other computers into at least one job;
   computer usable code for associating a job category with the at least one job;
   computer usable code for receiving from the first computer, an instruction to estimate an execution plan for the service, the instruction including the region code; and
   for each of the at least one job,
   computer usable code for searching the job category database using the region code and the job category to acquire a list of identifiers of operations corresponding to the at least one job;
   computer usable code for transmitting the list of identifiers of operations to a selected one of the other computers; and computer usable code for receiving from the selected one of the other computers, a response that the selected one of the other computers is capable of executing an operation identified in the list of identifiers of operations in combination with the at least one job.

2. The computer usable product according to claim 1, wherein the operation identifier list includes the identifier of an operation for the computer which executes the job, to acquire the operation parameter of the computer.

3. The computer usable product according to claim 2, wherein the operation for acquiring the operation parameter is in accordance with a service level agreement (SLA) between a user of the first computer and a user of the second computer.

4. A computer implemented method for dividing cloud computing service into individual jobs, the method executing in a computer network including a first computer, a second computer, other computers, and a job category database, wherein the job category database includes combinations of job categories, identifiers of operations to be executed, and a region code indicating a location of a computer which executes a job within the computer network, comprising:

the second computer dividing a service to be executed by any of the other computers into at least one job;

the second computer associating a job category with the at least one job;

the second computer receiving from the first computer, an instruction to estimate an execution plan for the service, the instruction including the region code; and for each of the at least one job, the second computer searching the job category database using the region code and the job category to acquire a list of identifiers of operations corresponding to the at least one job;

transmitting the list of identifiers of operations to a selected one of the other computers; and receiving from the selected one of the other computers, a response that the selected one of the other computers is capable of executing an operation identified in the list of identifiers of operations in combination with the at least one job.

5. The method according to claim 4, wherein the operation identifier list includes the identifier of an operation for the computer which executes the job, to acquire the the operation parameter of the computer.

6. The method according to claim 5, wherein the operation for acquiring the operation parameter is in accordance with a service level agreement (SLA) between a user of the first computer and a user of the second computer.

7. A data processing system for dividing cloud computing service into individual jobs, in a computer network to which a first computer, a second computer, other computers, and a job category database are connected, wherein the job category database includes combinations of the category of a job executed by any of the computers, identifiers of operations to be additionally executed when the job is executed by the any of the computers, and a region code indicating a location of a computer which executes the job within the computer network, comprising:

a storage device including a storage medium, wherein the storage device stores computer usable program code; and a processor, wherein the processor executes the computer usable program code, and wherein the computer usable program code comprises:

computer usable code for dividing a service to be executed by any of the other computers into at least one job;

computer usable code for associating a job category with the at least one job;

computer usable code for receiving from the first computer, an instruction to estimate an execution plan for the service, the instruction including the region code; and for each of the at least one job, computer usable code for searching the job category database using the region code and the job category to acquire a list of identifiers of operations corresponding to the at least one job;

computer usable code for transmitting the list of identifiers of operations to a selected one of the other computers; and computer usable code for receiving from computer which has received the identifier list selected one of the other computers, a response that the selected one of the other computers is capable of executing an operation identified in the list of identifiers of operations in combination with the at least one job.

8. The data processing system according to claim 7, wherein the operation identifier list includes the identifier of an operation for the computer which executes the job, to acquire the operation parameter of the computer.

9. The data processing system according to claim 8, wherein the operation for acquiring the operation parameter is in accordance with a service level agreement (SLA) between a user of the first computer and a user of the second computer.

* * * * *